United States Patent Office 3,444,168
Patented May 13, 1969

3,444,168
6 - (LOWER-ALKANOYL) - 4 - HYDROXY - 2 - MERCAPTO - 5,6,7,8 - TETRAHYDROPYRIDO[4,3 - d] PYRIMIDINES
Julian Richard Mayer, Arlington, Va., assignor to Sterling Drug Inc., New York, N.Y., a corporation of Delaware
No Drawing. Filed Dec. 30, 1966, Ser. No. 605,954
Int. Cl. C07d 57/20; A61k 27/00
U.S. Cl. 260—256.5                                    2 Claims

ABSTRACT OF THE DISCLOSURE 6-(lower-alkanoyl)-4-hydroxy-2-mercapto-5,6,7,8 - tetrahydropyrido[4,3-d]pyrimidines, having depressant and stimulatory activities, are prepared by reacting a lower-alkyl 1-(lower-alkanoyl)-4-oxopiperidine - 3 - carboxylate with thiourea in the presence of an alkaline condensation agent.

---

This invention relates to compositions of matter known in the art of chemistry as tetrahydropyrido[4,3-d]pyrimidines and to a process for preparing such compositions.

The invention sought to be patented, in its composition aspect, resides in the class of compounds which I designate 6-(lower-alkanoyl)-4-hydrovy-2-mercapto-5,6,7,8 - tetrahydropyrido[4,3-d]pyrimidines. Accordingly, I depict these compounds as having a molecular configuration in which mercapto, hydroxy and lower-alkanoyl are attached, respectively, to positions 2, 4 and 6 of 5,6,7,8-tetrahydropyrido[4,3-d]pyrimidine.

The invention sought to be patented, in its process aspect, is described as residing in the process of reacting a lower-alkyl 1-(lower-alkanoyl)-4-oxo-piperidine-3-carboxylate with thiourea in the presence of an alkaline condensation agent to prepare said 6-(lower-alkanoyl)-4-hydroxy-2-mercapto-5,6,7,8-tetrahydropyrido[4,3-d]pyrimidines.

The tangible embodiments of the composition aspect of the invention possess the inherent general physical properties of being colorless crystalline solids, substantially insoluble in water and of varying solubility in organic solvents. Examination of the compounds of the invention reveals, upon infrared spectrographic analysis, data confirming the molecular structures assigned to the compounds. These data, taken together with the nature of the starting materials, modes of synthesis and results of elementary analysis, positively confirm the structures of the compositions sought to be patented.

The tangible embodiments of the composition aspect of the invention possess the inherent applied use characteristics of exerting depressant and stimulatory effects in animal organisms, as evidence by known pharmacological evaluation procedures.

Each of the terms "lower-alkyl" and "lower-alkanoyl," as used throughout this specification, means alkyl and alkanoyl radicals having from one to six carbon atoms which can be arranged as straight or branched chains, among which are, for purposes of illustration but without limiting the generality of the foregoing, methyl ethyl, n-propyl, isopropyl, 2-butyl and n-hexyl for lower-alkyl; and, by formyl, acetyl, propionyl (n-propanoyl), isobutyryl (2-methyl-n-propanoyl) and caproyl (n-hexanoyl) for lower-alkanoyl.

Without limiting the generality of the foregoing, illustrative and preferred embodiments of my 6-(lower-alkanyl)-4-hydroxy-2-mercapto-5,6,7,8 - tetrahydropyrido[4,3 - d] pyrimidines are those of Formula I:

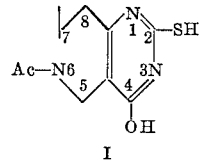

I where Ac is lower-alkanoyl.

The manner and process of making and using the invention will now be generally described so as to enable a person skilled in the art of chemistry to make and use the same, as follows:

The intermediate lower-alkyl 1-(lower-alkanoyl)-4-oxopiperidine-3-carboxylates are generally known and are prepared by known procedures. For example, ethyl 1-acetyl-4-oxopiperidine-3-carboxylate is prepared from N-acetyl-bis(2-carbethoxyethyl)amine using the reaction conditions of the well-known Dieckmann condensation. Use of other N-(lower-alkanoyl)-bis(2 - carbalkoxyethyl)amines yields the corresponding lower-alkyl 1-(lower-alkanoyl)-4-oxopiperidine-3 - carboxylate. Intermediate lower - alkyl 1-(lower-alkanyl)-4-oxopiperidine-3-carboxylates in which the piperidine ring bears from one to three lower-alkyl substituents at the 2-, 3- and 6-positions of the piperidine ring are obtained by using the appropriate N-(lower-alkanoyl)-di-(2-carbalkoxyalkyl)amine in the Dieckmann condensation; use of said lower-alkylated intermediates in the process of my invention yields compounds of Formula I having from one to three lower-alkyl substituents at the 5-, 7- and 8-positions of the pyrido[4,3-d]pyrimidine ring, which compounds have the same utility as the final products depicted above.

The 6-(lower-alkanoyl)-4-hydroxy-2-mercapto-5,6,7,8-tetrahydropyrido[4,3-d]pyrimidines are prepared by reacting said lower-alkyl 1-(lower-alkanoyl)-4-oxopiperidine-3-carboxylate with thiourea in the presence of an alkaline condensation agent, e.g. an alkali metal carbonate, an alkali metal hydroxide or an alkali metal alcoholate, preferably using a suitable solvent inert under the reaction conditions, e.g., water, methanol, ethanol, benzene, tetrahydrofuran or mixtures thereof, e.g., water-ethanol. While the reaction was found to proceed rapidly by heating the reactants on a steam bath, other temperatures in the range of about 30° to 150° C., preferably between 70° and 100° C., can be used.

The best mode contemplated by the inventor of carrying out his invention will now be set forth as follows:

Dissolve 6.5 g. of ethyl-1-acetyl-4-oxo-piperidine-3-carboxylate in about 75 cc. of water and add 2.3 g. of thiourea to the solution, and warm the resulting mixture to 70° C. To the stirred reaction mixture add 4.1 g. of potassium carbonate. Heat the reaction mixture on a steam bath for about forty-five minutes. Add water to the reaction mixture, cool it, and adjust it to a pH of about 8 by addition of acetic acid. Collect the precipitated colorless solid, triturate it with ethanol and dry it. Dissolve the solid in 5% aqueous sodium hydroxide solution, filter the solution through infusorial earth, and acidify the filtrate. Collect the resulting precipitate and dry it in vacuo at 1–2 mm. and 100° C. until there is no further loss in weight. There is thus obtained 4.9 g. of 6-acetyl-4-hydroxy - 2 - mercapto - 5,6,7,8 - tetrahydropyrido[4,3-d]

pyrimidine, as a colorless crystalline solid, M.P. >300° C. (corr.).

The foregoing description of the invention is for purpose of illustration and does not limit the generality of the applicability of the inventive concept as herein set forth. Other 6-(lower-alkanoyl)-4-hydroxy-2-mercapto-5,6,7,8-tetrahydropyrido[4,3-d]pyrimidines can be prepared in the manner above described by substituting a molar equivalent quantity of the appropriate lower-alkyl 1-(lower-alkanoyl) - 4 - oxopiperidine - 3-carboxylate for ethyl 1-acetyl-4-oxopiperidine-3-carboxylate. Further illustrative compounds thus prepared are: 6-formyl-4-hydroxy - 2 - mercapto - 5,6,7,8 - tetrahydropyrido[4,3-d] pyrimidine using methyl 1 - formyl - 4 - oxopiperidine - 3-carboxylate; 4-hydroxy-2-mercapto - 6 - propionyl-5,6,7,8-tetrahydropyrido[4,3-d]pyrimidine using ethyl 1-propionyl - 4 - oxopiperidine - 3 - carboxylate; 4 - hydroxy-6 - isobutyryl - 2 - mercapto - 5,6,7,8 - tetrahydropyrido [4,3-d]pyrimidine using n-butyl 1-isobutyryl-4-oxopiperidine-3-carboxylate; and, 6-caproyl-4-hydroxy-2-mercapto-5,6,7,8-tetrahydropyrido[4,3-d]pyrimidine using ethyl 1-caproyl-4-oxopiperidine-3-carboxylate. The above intermediate lower-alkyl 1-(lower-alkanoyl)-4-oxopiperidine-3-carboxylates are obtained by a Dieckmann condensation of the appropriate N-(lower-alkanoyl)bis[2-carbo-(lower-alkoxy)ethyl]amine which, in turn, is obtained by reaction of the appropriate bis[2-carbo-(lower-alkoxy) ethyl]amine with formic acid (to form the formyl compound) or appropriate lower-alkanoyl chloride or lower-alkanoic anhydride.

My 6-(lower-alkanoyl)-4-hydroxy-2-mercapto-5,6,7,8-tetrahydropyrido[4,3-d]pyrimidines when administered orally to mice using a modified procedure of the photocell activity cage method of Dews [Brit. J. Pharmacol. 8, 46 (1953)] were found to have psychomotor stimulatory and depressant properties at different dose levels. For example, 6-acetyl-4-hydroxy-2-mercapto-5,6,7,8-tetrahydropyrido[4,3-d]pyrimidine when tested by this procedure was found to produce stimulation (63% increase in activity over controls) at 8 mg./kg. when administered intraperitoneally and to produce depression (38% decrease in activity over controls) at 100 mg./kg. intraperitoneally. The foregoing indicates utility of the compound as a stimulant at the lower dose and as a depressant at the higher dose.

The subject matter which the applicant regards as his invention is particularly pointed out and distinctly claimed as follows:

1. 6 - (lower - alkanoyl) - 4 - hydroxy - 2 - mercapto-5,6,7,8-tetrahydropyrido[4,3-d]pyrimidine.
2. 6 - acetyl - 4 - hydroxy - 2 - mercapto - 5,6,7,8-tetrahydropyrido[4,3-d]pyrimidine, according to claim 1 where lower-alkanoyl is acetyl.

References Cited

UNITED STATES PATENTS

| | | | |
|---|---|---|---|
| 3,046,276 | 7/1962 | Miller et al. | 260—256.4 |
| 3,186,991 | 6/1965 | Ohmacker | 260—256.5 |
| 3,235,554 | 2/1966 | Papesch | 260—256.4 |
| 3,299,069 | 1/1967 | Schmidt et al. | 260—256.5 |
| 3,306,901 | 2/1967 | Ohnacker | 260—256.5 |
| 3,309,368 | 3/1967 | Gadekar et al. | 260—256.4 |

ALEX MAZEL, *Primary Examiner.*

R. J. GALLAGHER, *Assistant Examiner.*

U.S. Cl. X.R.

260—294.3; 424—251